United States Patent
Xu et al.

(10) Patent No.: US 8,081,698 B2
(45) Date of Patent: Dec. 20, 2011

(54) METHOD AND APPARATUS FOR SELECTION MECHANISM BETWEEN OFDM-MIMO AND LFDM-SIMO

(75) Inventors: Hao Xu, San Diego, CA (US); Byoung-Hoon Kim, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1023 days.

(21) Appl. No.: 11/770,600

(22) Filed: Jun. 28, 2007

(65) Prior Publication Data

US 2008/0095263 A1    Apr. 24, 2008

Related U.S. Application Data

(60) Provisional application No. 60/818,223, filed on Jun. 29, 2006.

(51) Int. Cl.
 *H04B 7/02* (2006.01)
(52) U.S. Cl. ........ 375/267; 375/295; 370/329; 370/437; 370/465; 370/466; 370/467
(58) Field of Classification Search .................. 375/267, 375/295; 370/329, 437, 465, 466, 467
See application file for complete search history.

(56) References Cited

U.S. PATENT DOCUMENTS

| | | | | |
|---|---|---|---|---|
| 7,304,939 | B2 * | 12/2007 | Steer et al. | 370/208 |
| 2004/0202136 | A1 * | 10/2004 | Attar et al. | 370/333 |
| 2005/0094598 | A1 * | 5/2005 | Medvedev et al. | 370/329 |
| 2005/0201453 | A1 | 9/2005 | Gu | |
| 2005/0204266 | A1 | 9/2005 | Mahadevappa | |
| 2005/0281221 | A1 | 12/2005 | Roh | |
| 2006/0067263 | A1 | 3/2006 | Li | |
| 2006/0078075 | A1 | 4/2006 | Stamoulis | |
| 2006/0126513 | A1 | 6/2006 | Li | |

FOREIGN PATENT DOCUMENTS

| | | |
|---|---|---|
| EP | 1655872 | 5/2006 |
| KR | 20060058290 A | 5/2006 |
| RU | 2003135853 | 4/2005 |
| WO | WO02099995 | 12/2002 |
| WO | WO03085876 | 10/2003 |
| WO | 2005088866 | 9/2005 |

OTHER PUBLICATIONS

International Search Report—PCT/US07/072538, International Search Authority—European Patent Office—May 26, 2008.

(Continued)

*Primary Examiner* — Chieh M Fan
*Assistant Examiner* — Leila Malek
(74) *Attorney, Agent, or Firm* — Milan Patel; Liem T. Do

(57) ABSTRACT

Systems and methodologies are described that facilitate switching between various combinations of MIMO, SIMO, SISO and OFDM, LFDM and IFDM. According to various aspects, a method for a wireless communication network is provided that includes: receiving a first set of data information, wherein the first set of information comprising a first value, determining if the first value is above a threshold and transmitting an indication to switch to using a first transmission technique if determined that the first value is above the threshold.

30 Claims, 17 Drawing Sheets

OTHER PUBLICATIONS

Chae, et al.: "Adaptive Spatial Modulation for MIMO-ODFM", Wireless Communications and Networking Conference, 2004 IEEE Atlanta, GA, USA, Mar. 21-25, 2004, Piscataway. NJ, USA. IEEE. vol. 1. Mar. 21, 2004, pp. 87-92. XP010708355.

Chen, et al.: "A Low-Complexity Space-Time OFDM Multiuser System", IEEE Transactions On Wireless Communications, IEEE Service Center, Pisacataway, NJ, USA, vol. 4, No. 3, May 2005, pp. 998-1007, XP011131426.

Dahlman, et al.: "A Framework for Future Radio Access", Vehicular Technology Conference, 2005, VTC 2005-Spring, 2005 IEEE 61st, Stockholm, Sweden, Apr. 30-May 1, 2005, Piscataway, NJ, USA, IEEE, May 30, 2005, pp. 2944-2948, XP010855989.

Ekström, et al.: "Technical Solutions For The 3G Long-Term Evolution", IEEE Communications Magazine, IEEE Service Center, New York, NY, USA, Mar. 2006, pp. 38-45, XP002400403.

Falconer, et al.: "Frequency Domain Equalization For Single-Carrier Broadband Wireless Systems", IEEE Communications Magazine, IEEE Service Center, Pisacataway, NJ, USA, vol. 40, No. 4, Apr. 2002, pp. 58-66, XP011092809.

Feng, et al.: "Generalization of Single-Carrier and Multicarrier Cyclic Prefixed Communication", Global Telecommunications Conference, 2005, Globecom '05, IEEE, St. Louis, MO, USA Nov. 28, Dec. 2, 2005, Pisataway, NJ, USA, IEEE, Nov. 28, 2005, pp. 2174-2178.

Hosein, et al.: "Dynamic Power Headroom Threshold For Mobile Rate Determination In A CDMA Network", Vehicular Technology Conference, 2004, VTC 2004-Spring, 2004 IEEE 59th Milan, Italy, May 17-19, 2004, Piscataway, NJ, USA, IEEE, May 17, 2004, pp. 2404-2408.

Zhang, et al.: "Comparison Of The Link Level Performance Between OFDMA and SC-FDMA", Communications And Networking In China, 2006, Chinacom '06, First International Conference On, IEEE, PI, Oct. 2006, pp. 1-6, XP031074795.

Taiwanese Search report-096123821-TIPO-Jan. 17, 2011.

Translation of Office Action in Russian application 2009102826 corresponding to U.S. Appl. No. 11/770,600, citing RU2003135853, WO2005088866A1, US20060126513 and US20060067263 dated Feb. 3, 2011.

Written Opinion-PCT/US07/072538, International Search Authority, European Patent Office, May 26, 2008.

* cited by examiner

METHOD AND APPARATUS FOR SELECTION MECHANISM BETWEEN OFDM-MIMO AND LFDM-SIMO

CROSS-REFERENCE TO RELATED APPLICATIONS

This application claims the benefit of U.S. Provisional Patent application Ser. No. 60/818,223 entitled "METHOD AND APPARATUS FOR SELECTION MECHANISM BETWEEN OFDM-MIMO AND LFDM-SIMO" which was filed Jun. 29, 2006. The entirety of the aforementioned applications is herein incorporated by reference.

BACKGROUND

I. Field

The following description relates generally to wireless communications, and more particularly to providing a mechanism for switching between OFDM-MIMO and LFDM-SIMO techniques.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiplexing (OFDM), localized frequency division multiplexing (LFDM), orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to a communication link from base stations to mobile devices, and the reverse link (or uplink) refers to a communication link from mobile devices to base stations. Further, communications between mobile devices and base stations may be established via single-input single-output (SISO) systems, multiple-input single-output (MISO) systems, multiple-input multiple-output (MIMO) systems, single-input multiple output (SIMO), and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region.

SIMO systems commonly employs a single transmit antenna and plurality of receive antenna. SIMO systems can be used to perform beam-forming by combining antenna signals to point in a specific direction. Further, receive combining diversity, where antenna signals are combined to optimally adapt to local channel conditions, can be achieved using SIMO systems. One well-known technique is Maximum-Ratio-Combining (MRC), in which antenna signals are weighted, phase-aligned, and added in such a way as to maximize the signal-to-noise (SNR) ratio.

The OFDM system has higher peak to average ratio (PAR) than single carrier wave forms. This is true at all SNR ranges, however, the overall link efficiency between OFDM and LFDM techniques depends on the operating SNR as well as MIMO capability of the users. The PAR has more dominant impact on the power limited users, (e.g. the users with low operating SNR at the cell edges). For power limited users, the transmission data rate is limited by the power amplifier (PA) headroom. In order to operate in the linear region of the PA, one has to back off more in the OFDM case due to the increased PAR. The link efficiency of OFDM is small compared to OFDM for the low SNR case. Overall, the link loss due to the PAR back off outweighs the link efficiency achieved by OFDM technique, therefore, it is more advantageous to use LFDM. In fact some other low PAR system, such as interleaved frequency domain multiplexing (IFDM) system, will have the same tradeoff such as LFDM vs. OFDM as well. For the high SNR users, on the other hand, the performance advantage of OFDM compared to LFDM is significant. This is especially true for the high end MIMO users close to the base station.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance an aspect, a method for a wireless communication network, receiving a first set of data information, wherein the first set of information comprising a first value, determining if the first value is above a threshold and transmitting an indication to switch to using a first transmission technique if determined that the first value is above the threshold.

In accordance an aspect, a method for a wireless multicast or broadcast communication network, monitoring a reference signal level, calculating available power headroom (PHR) value using the reference signal level, transmitting the PHR value, receiving an indication to switch to using an OFDM-MIMO transmission technique, and switching to the OFDM-MIMO transmission technique if determined that the PHR value is above a threshold.

In accordance an aspect, a method for a wireless communication network, transmitting a data rate value request, receiving an indication to switch to using OFDM-MIMO transmission technique and switching to OFDM-MIMO transmission technique.

In accordance an aspect, a method for a wireless network, calculating signal to noise ration (SNR) value, transmitting the SNR value, receiving an indication to switch to using OFDM-MIMO transmission technique, and switching to OFDM-MIMO transmission technique.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
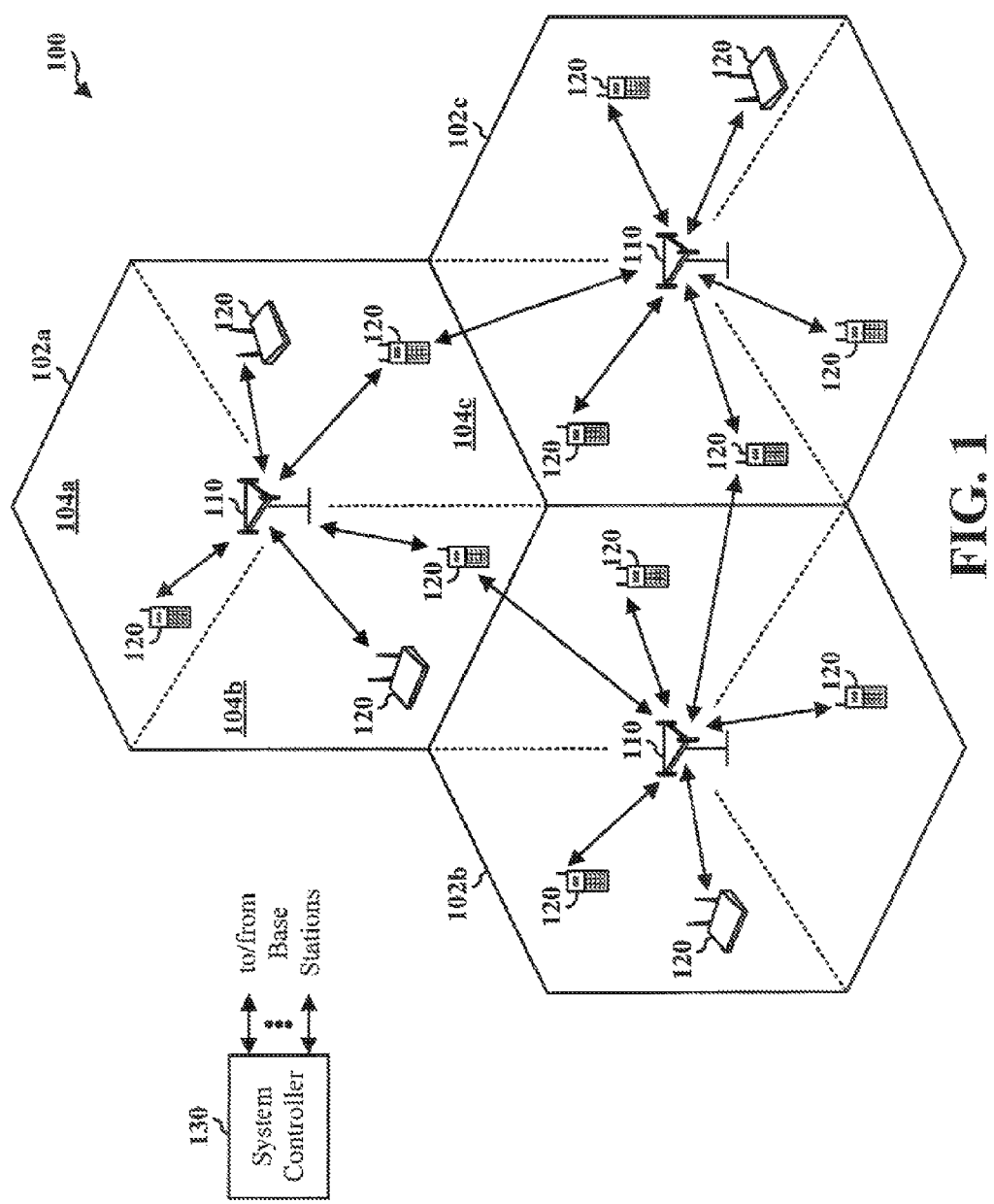
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides synchronized transmission and retransmission of SFN data. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Also, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates a wireless communication system 100 with multiple base stations 110 and multiple terminals 120, such as may be utilized in conjunction with one or more aspects. A base station is generally a fixed station that communicates with terminals and may also be called an access point, a Node B, or some other terminology. Each base station 110 provides communication coverage for a particular geographic area, illustrated as exemplary geographic areas, labeled 102a, 102b, and 102c. The term "cell" can refer to a base station and/or its coverage area depending on the context in which the term is used. To improve system capacity, a base station coverage area can be partitioned into multiple smaller areas (e.g. three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
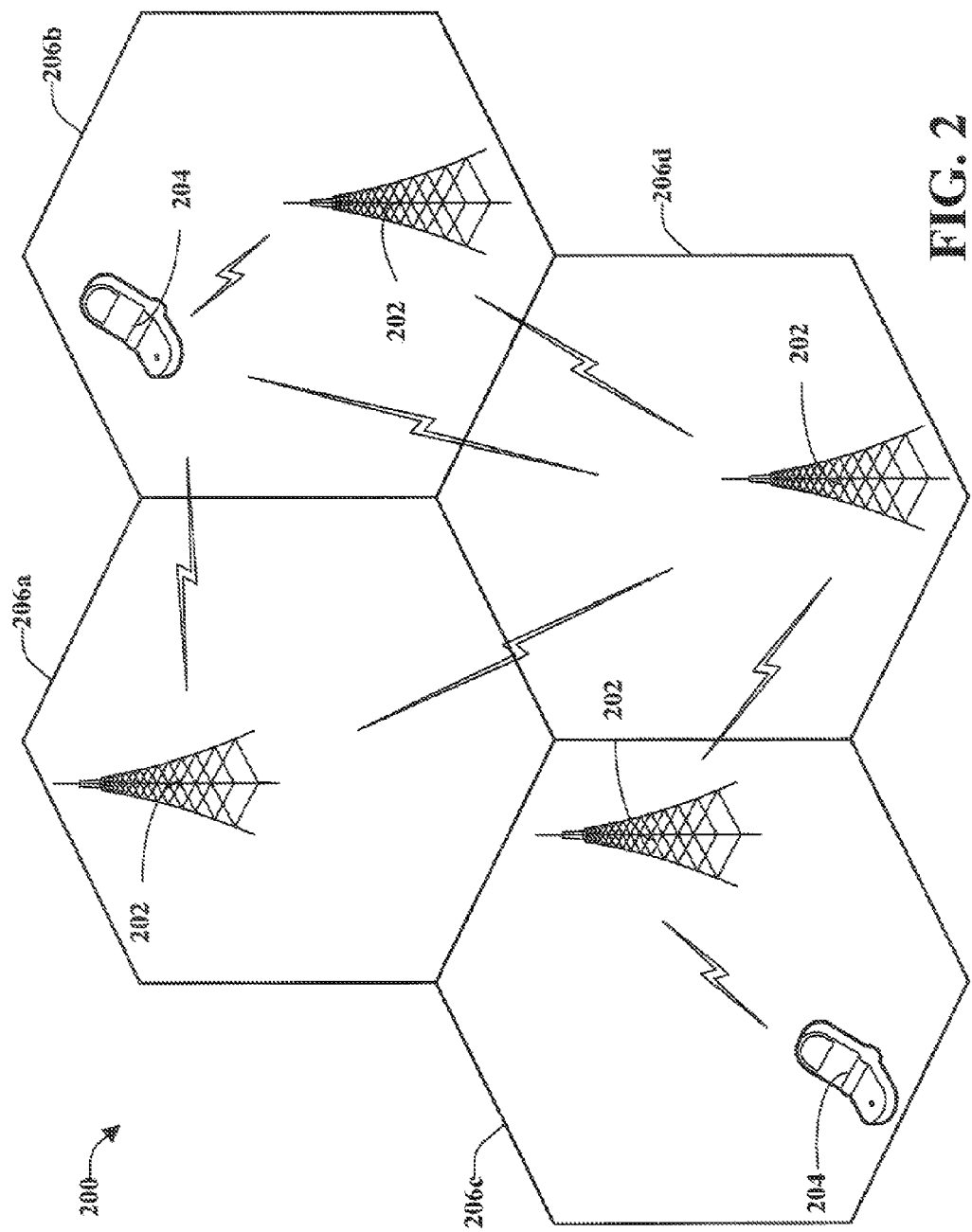
FIG. 2 depicts an example communications apparatus for employment with a wireless communications environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 may be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to switch between MIMO and SIMO transmission techniques.

The main difference between OFDM-MIMO and LFDM-SIMO at the transmitter is the Discrete Fourier Transform (DFT) operation and number of transmitted streams. For OFDM-MIMO operation, independent streams are generated for each antenna, and the data of each antenna can by-pass the DFT operation. For LFDM-SIMO, only one stream is generated and DFT is performed before the Inverse Fast Fourier Transform operation block.

For LFDM SIMO, the receiver uses a frequency domain equalizer possibly with a maximal ratio combining (MRC) or Minimum Mean Square Error (MMSE) combiner across various receiver antennas. For OFDM MIMO, a spatial MMSE receiver can be used for MIMO processing from different antennas. Successive Interference Cancellation (SIC) receiver is also an option for decoded MIMO streams.

Theoretical analysis and link simulations showed significant gain of OFDM vs localized FDM (LFDM) for high SNR users. For high SNR users, using SIMO LFDM instead of MIMO OFDM will lead to a reduction in peak rate for frequency selective channels. In addition, from an implementation perspective, the complexity is much less for OFDM MIMO instead of LFDM MIMO.

On the other hand, for the low SNR users, LFDM is the preferred mode of operation due to its peak to average ratio (PAR) advantage over OFDM. In fact, there is a 2.3-2.6 dB PAR gain with QPSK and a 1.5-1.9 dB gain with 16 QAM when using LFDM vs. OFDM. For power limited users at the cell edges, using OFDM transmission will lead to coverage loss.

The scheduler may switch between SIMO LFDM and MIMO OFDM based on the power spectrum density, data rate, SNR, PAR difference between OFDM and LFDM, and plurality of modulation and coding tables. The MIMO channel estimation can be obtained either from a broadband pilot or from a specially designed request channel. By switching between SIMO OFDM and MIMO LFDM, one can significantly improve both overall system throughput and the single use peak data rate.

In another aspect, the scheduler may switch between the various combination of SIMO, SISO and MIMO and OFDM, LFDM and IFDM techniques (for example, switch between 1) SIMO-LFDM and SIMO-OFDM, SIMO-IFDM, MIMO-OFDM, MIMO-LFDM, MIMO-IFDM, SISO-OFDM, SISO-IFDM or SISO-LFDM; 2) MIMO-OFDM to MIMO-IFDM, MIMO-LFDM, SIMO-LFDM, SIMO-IFDM, SIMO-OFDM, SISO-LFDM, SISO-OFDM, or SISO-IFDM; 3) SISO-OFDM to SISO-LFDM, SISO-IFDM, MIMO-OFDM, MIMO-LFDM, MIMO-IFDM, SIMO-OFDM, SIMO-LFDM or SIMO-IFDM; etc.).

Referring to FIGS. 3-8, methodologies relating a mechanism for switching between OFDM-MIMO and LFDM-SIMO transmission techniques are illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Figure 3:
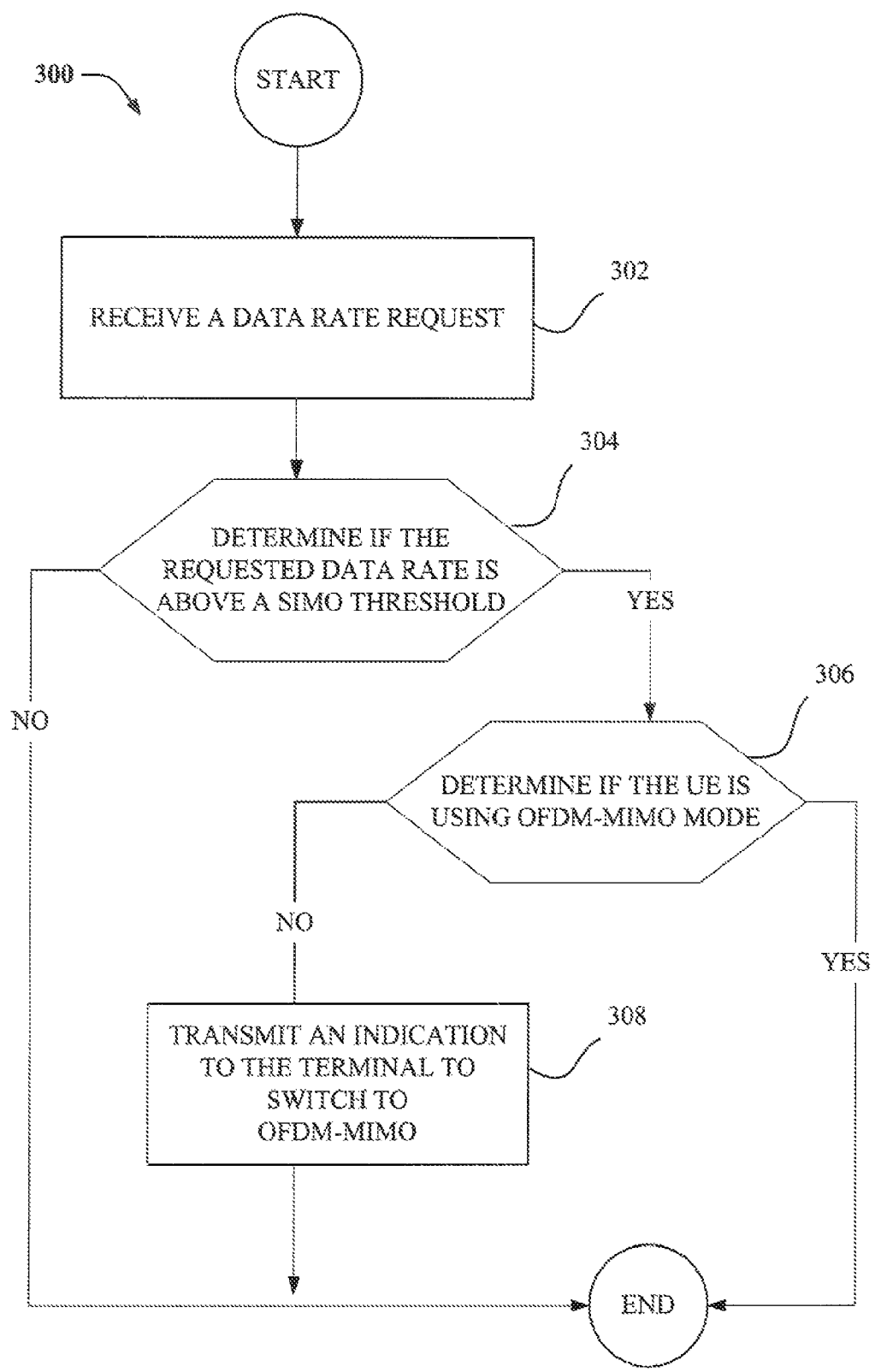
FIG. 3 illustrates a sample methodology for providing switching mechanism based on requested data rate.

Turning specifically to FIG. 3, a methodology 300 that facilitates a switching mechanism based on requested data rate in wireless communication system is illustrated. Method 300 can facilitate transmitting a request from base station (e.g., an enhanced Node base station, eNode B, access point (AP) or like mechanism) to one or more terminal devices (e.g. user equipment, UE, AT, or like mechanism) a wireless communication network. The method starts at 302, when the AP receives a data rate request from a terminal.

In an aspect, after receiving the data rate request from UE, the method moves to 304, a determination is made as to whether the requested data rate is above a SIMO threshold. The SIMO threshold for data rate may be predetermined and may be changed based operator of the infrastructure. In an aspect, the SIMO threshold is determined after running simulation to derive the optimum data rate value to switch the user from LFDM-MIMO to OFDM-MIMO. The SIMO threshold is known to both UE and AP. In an aspect, the SIMO threshold may be provided to each UE, when the UE registers with an AP. The SIMO threshold may be different from one AP to another AP. If the requested data rate is above a SIMO threshold, then method moves to 306, otherwise, the method move to the end and terminates. At 306, if the UE is using OFDM-MIMO transmission mode, then the method moves to the end and terminates. Otherwise, the method moves to 308 to transmit an indication to the terminal to switch to using OFDM-MIMO transmission. The indication may be transmitted using an existing communication link between UE and AP or set up a specific communication link to provide the indication. A message comprising a series of bits is signaled to the terminal, wherein a portion of that message comprising one or more bits as the indication to switch.

Figure 4:
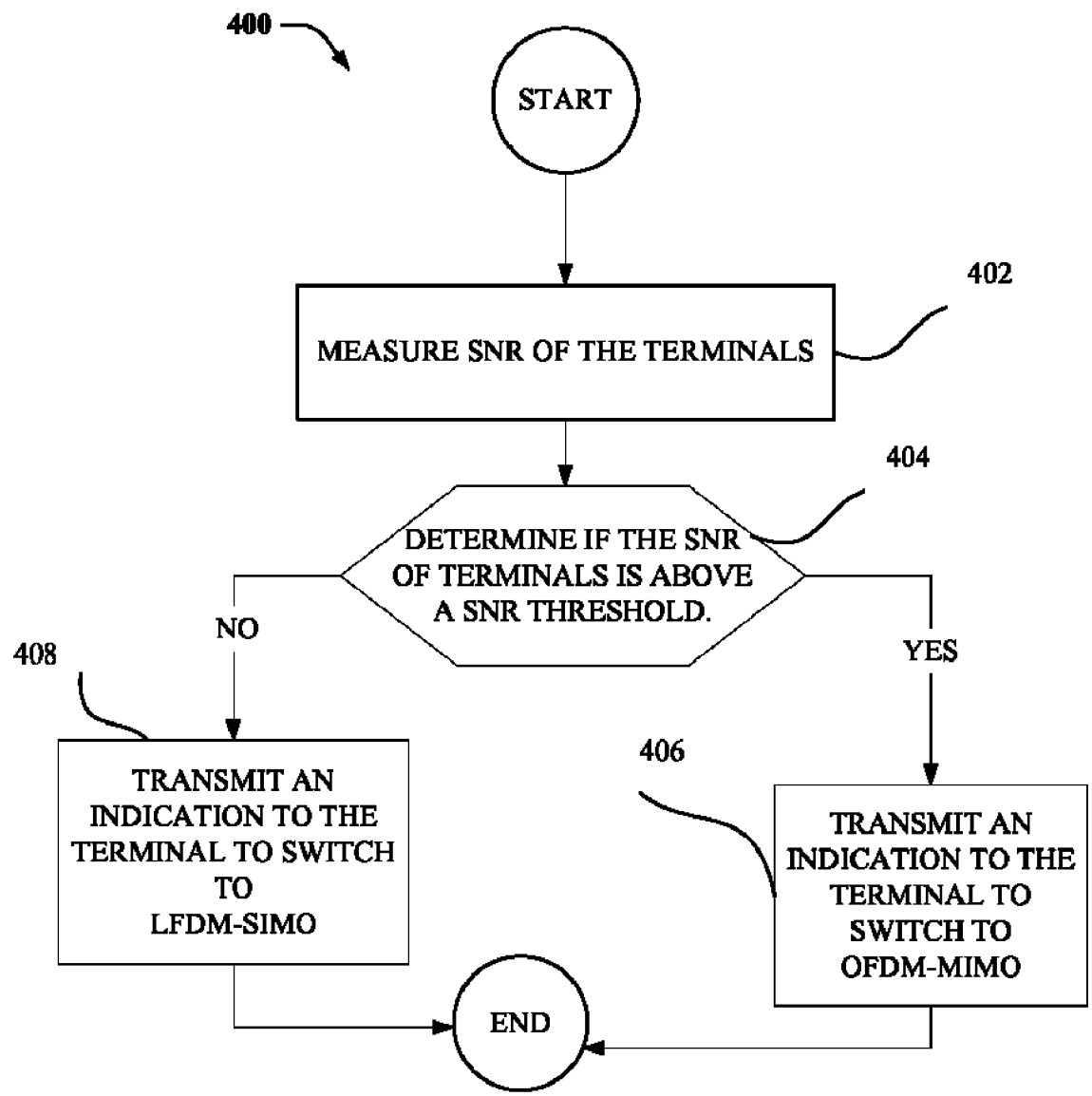
FIG. 4 illustrates a sample methodology for providing switching mechanism based on signal to noise ratio.

Turning to FIG. 4, an example methodology 400 that facilitates a switching mechanism is illustrated. According to another aspect, the switching request is based on SNR measured by the UEs that are served by the AP in a wireless communications system. The method begins at 402, the AP receives SNR measurements of a terminal. In wireless communication system according to an aspect, the AP periodically requests the SNR from terminals. Upon receiving the SNR measurement, the method moves to 404. At 404, the AP determines if the received SNR of terminal is above a SNR threshold. The SNR threshold is known to both UE and AP. The SNR threshold may be predetermined and may be changed based operator of the infrastructure. In an aspect, the SNR threshold is determined after running simulation. In an aspect, the SNR threshold represents a maximum value of acceptable SNR measurements before the efficiency of the system starts to decrease. In another aspect, the threshold value may be dynamically changed by the system. In another aspect, the SNR threshold may be different from one AP to another AP. The threshold may be provided to each UE, when the UE registers with an AP. Referring back to 404, if determined that the SNR measurement of a terminal is above the SNR threshold, then the method moves to 406, wherein the AP transmits an indication to the UE reporting the high SNR to switch to OFDM-MIMO transmission technique. The AP may transmit the indication as a broadcast message to cover all the UEs with high SNR to switch or use an existing communication link with the UE reporting high SNR. A message comprising a series of bits is signaled to the terminal, wherein a portion of that message comprising one or more bits as the indication to switch.

Referring back to 404, if determined that the SNR measurement of a terminal is not above the SNR threshold, then the method moves to 408, wherein the AP transmits an indication to the UE reporting a low SNR to switch to LFDM-SIMO transmission technique. The AP may transmit the indication as a broadcast message to cover all the UEs with low SNR to switch or use an existing communication link with the UE reporting high SNR. By switching between LFDM-SIMO and OFDM-MIMO, the system is able function at an optimum efficiency.

Figure 5:
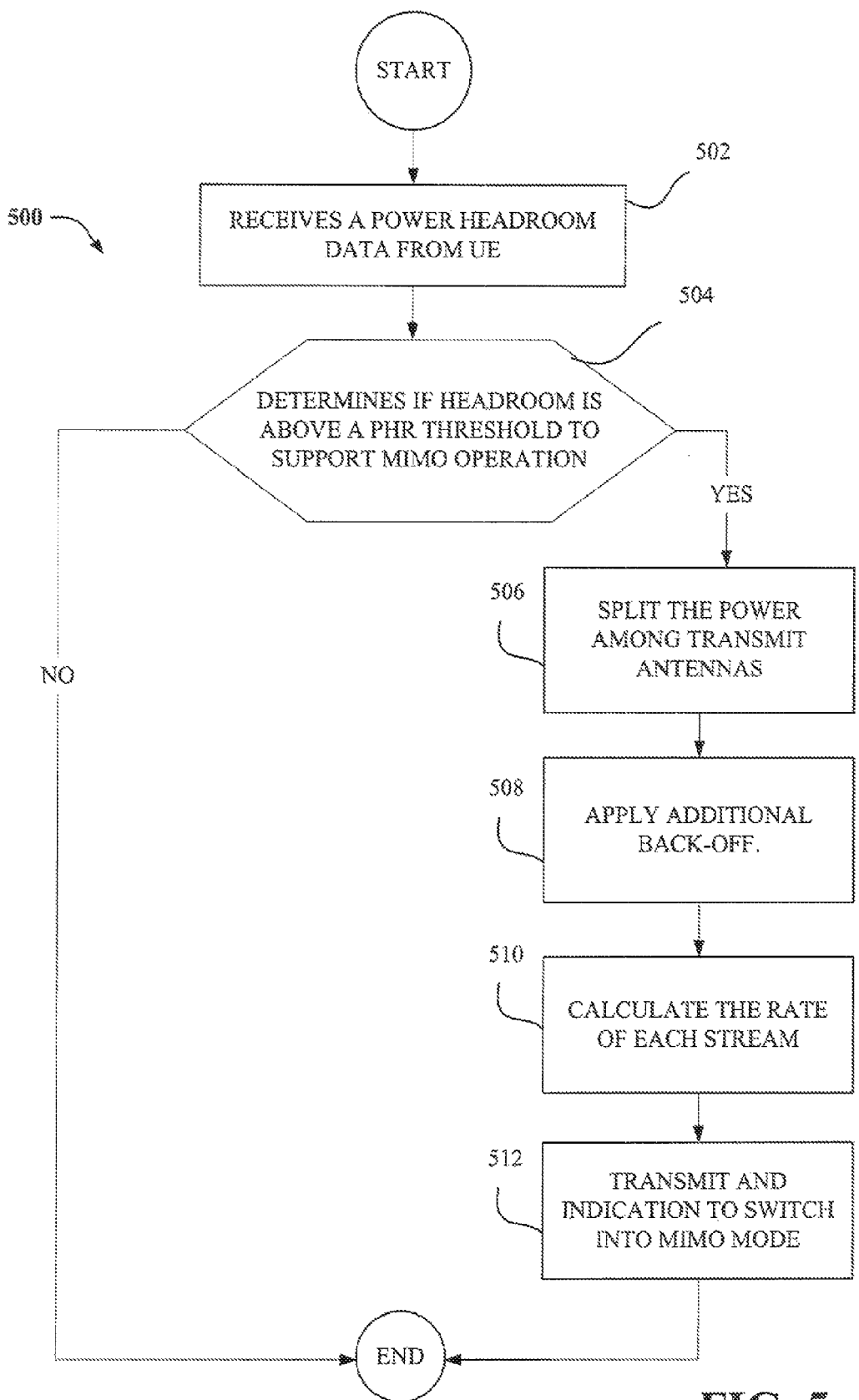
FIG. 5 illustrates a sample methodology for providing switching mechanism based on power headroom information.

Turning to FIG. 5, an example methodology 500 that facilitates a switching mechanism is illustrated. According to another aspect, the switching request is based on power headroom (PHR) data received from the UEs that are served by the AP in a wireless communications system. The method begins at 502, the AP receives a power headroom data from the UE. Upon receiving the power headroom data, the method moves to 504. At 504, the AP determines if the PHR data received from a UE is above a PHR threshold. The PHR threshold is known to both UE and AP. The PHR threshold may be predetermined or may be changed based operator of the infrastructure. In an aspect, the PHR threshold is determined after running simulation. In an aspect, the PHR threshold represents a maximum value of acceptable PHR value before the efficiency of the system starts to decrease. In another aspect, the threshold value may be dynamically changed by the system. The PHR threshold may be provided to each UE, when the UE registers with an AP.

Referring back to 504, if determined that the PHR measurement of a terminal is above the PHR threshold, then the method moves to 506. Otherwise, the method moves to the end and terminates. If the PHR measurement of a terminal is above the PHR threshold, then at 506, the transmit power is adjusted by number of antenna used, for example splitting the transmit power among one or more transmit antennas. At 508, the transmit power may be further adjusted by applying additional PAR back-off based information received from terminal. At 510, AP calculates the rate of each stream. At 512, the AP transmits an indication to the UE with high PHR to switch to OFDM-MIMO transmission technique. The AP may transmit the indication as a broadcast message to cover all the UEs with high PHR to switch or use an existing communication link with the UE reporting high PHR. For example, a message comprising a series of bits is signaled to the terminal, wherein a portion of that message comprising one or more bits as the indication to switch. By switching to OFDM-MIMO when PHR measurements are high, the system is able function at an optimum efficiency.

Figure 6:
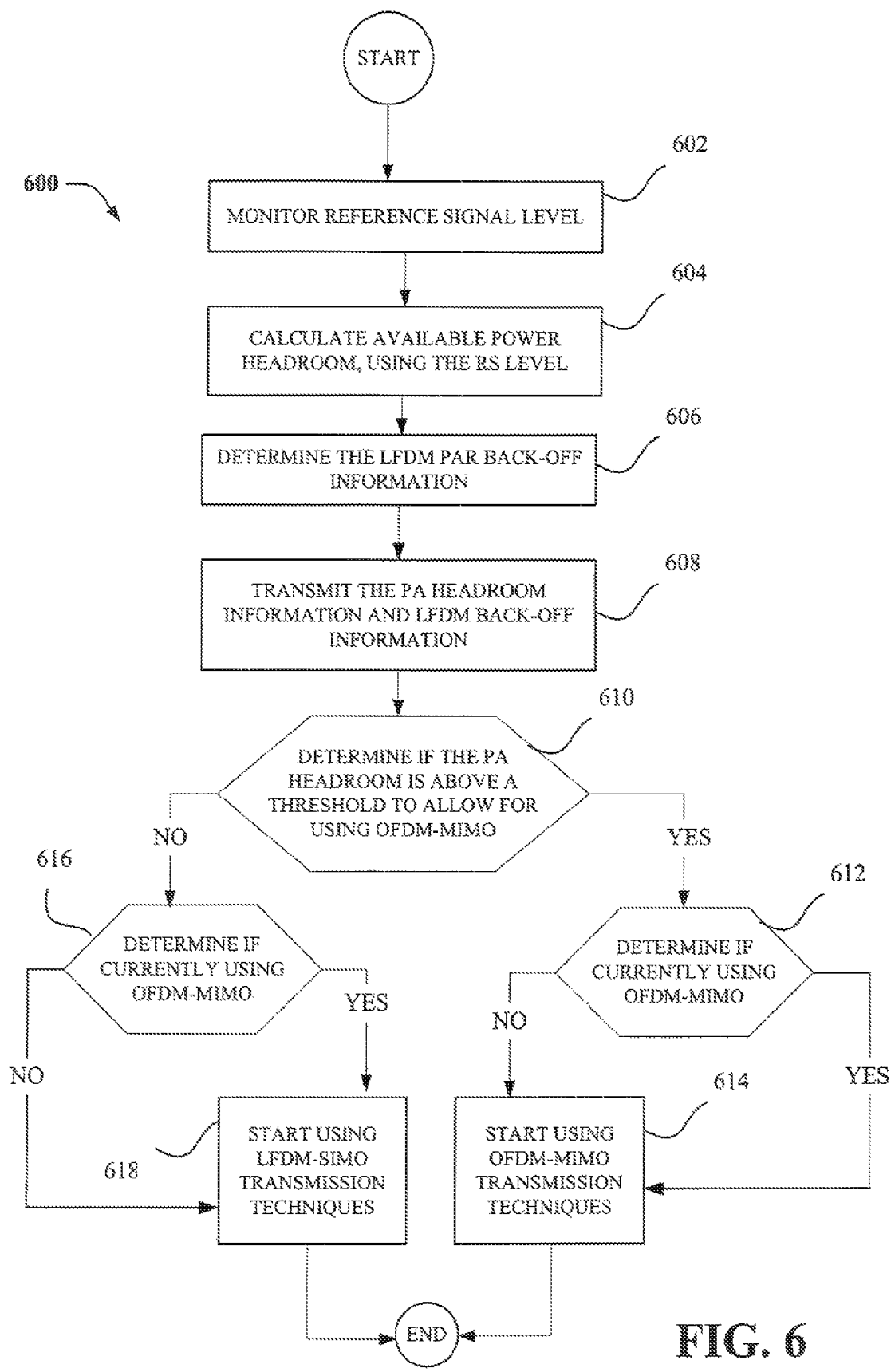
FIG. 6 illustrates a sample methodology for providing switching mechanism by the terminal based on power headroom calculations.

Turning to FIG. 6, an example methodology 600 that facilitates a switching mechanism for a terminal is illustrated. The method begins at 602, wherein the method monitors the reference signal (RS) in a communication system. At 604, the power headroom (PHR) data is calculated using the RS level. At 606, the LFDM PAR back-off information is determined. At 608, transmit the PHR data and LFDM PAR back-off information to AP. Since, the PHR threshold value is known to both, the AP and UE, the UE may request AP to switch to OFDM-MIMO transmission technique or switch to OFDM-MIMO transmission technique if received an indication from AP. According to an aspect, at 610, the method determines if the PHR value is above a PHR threshold. The determination is performed either by checking the calculated PHR value against the PHR threshold or checking the indication received from AP comprising an indication that PHR value is above the threshold and a request to switch transmission technique. If determined that PHR value is above the PHR threshold, the method moves to 612. At 612, if determined that the current transmission technique is OFDM-MIMO, then the method moves to the end and terminates. Otherwise, at 614, the method starts using OFDM-MIMO transmission technique (i.e. switched techniques).

Referring back to 610, if determined that the PHR value is not above the PHR threshold, then the method moves to 616. At 616, if determined that the current transmission technique is OFDM-MIMO, then the method starts using LFDM-SIMO transmission technique (i.e. switched techniques). Since, interleaved FDM is also a low PAR system, which is close to LFDM, in an aspect, at 616, the method may start using SIMO-IFDM transmission technique. Otherwise, the method moves to the end and terminates.

Figure 7:
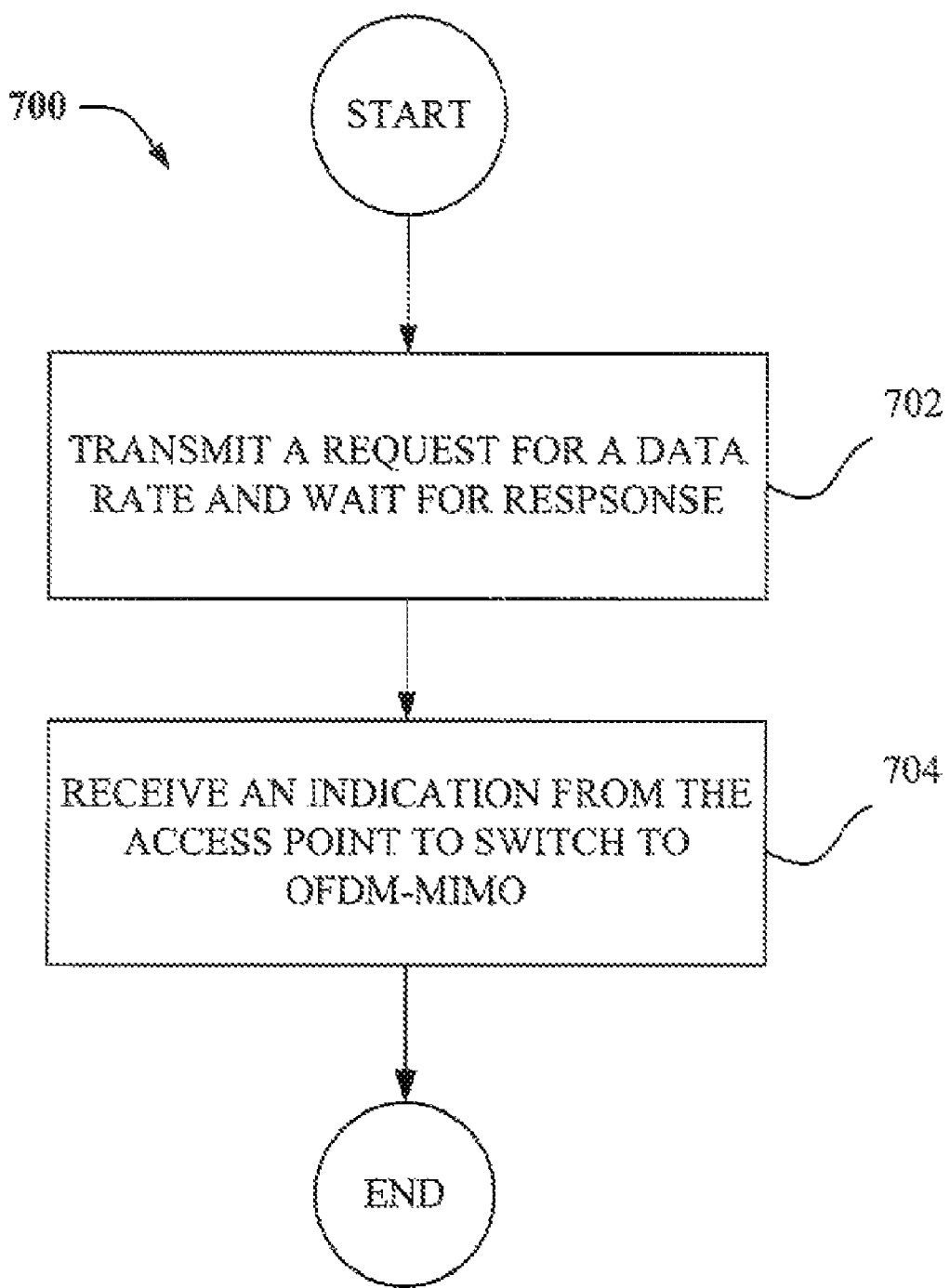
FIG. 7 illustrates a sample methodology for providing switching mechanism by the terminal based on requested data rate.

Turning to FIG. 7, an example methodology 700 that facilitates a requesting data rate is illustrated. According to an aspect, at block 702, the method requests a data rate to AP. After requesting the data rate, the method waits for a response. If the requested data is above a threshold, the AP may request the UE to switch to OFDM-MIMO transmission mode. At, block 704, the method receives an indication from the AP to switch to using OFDM-MIMO transmission technique. Depending on rules set up in the UE or other conditions, the UE may make another request or switch to using OFDM-MIMO.

Figure 8:
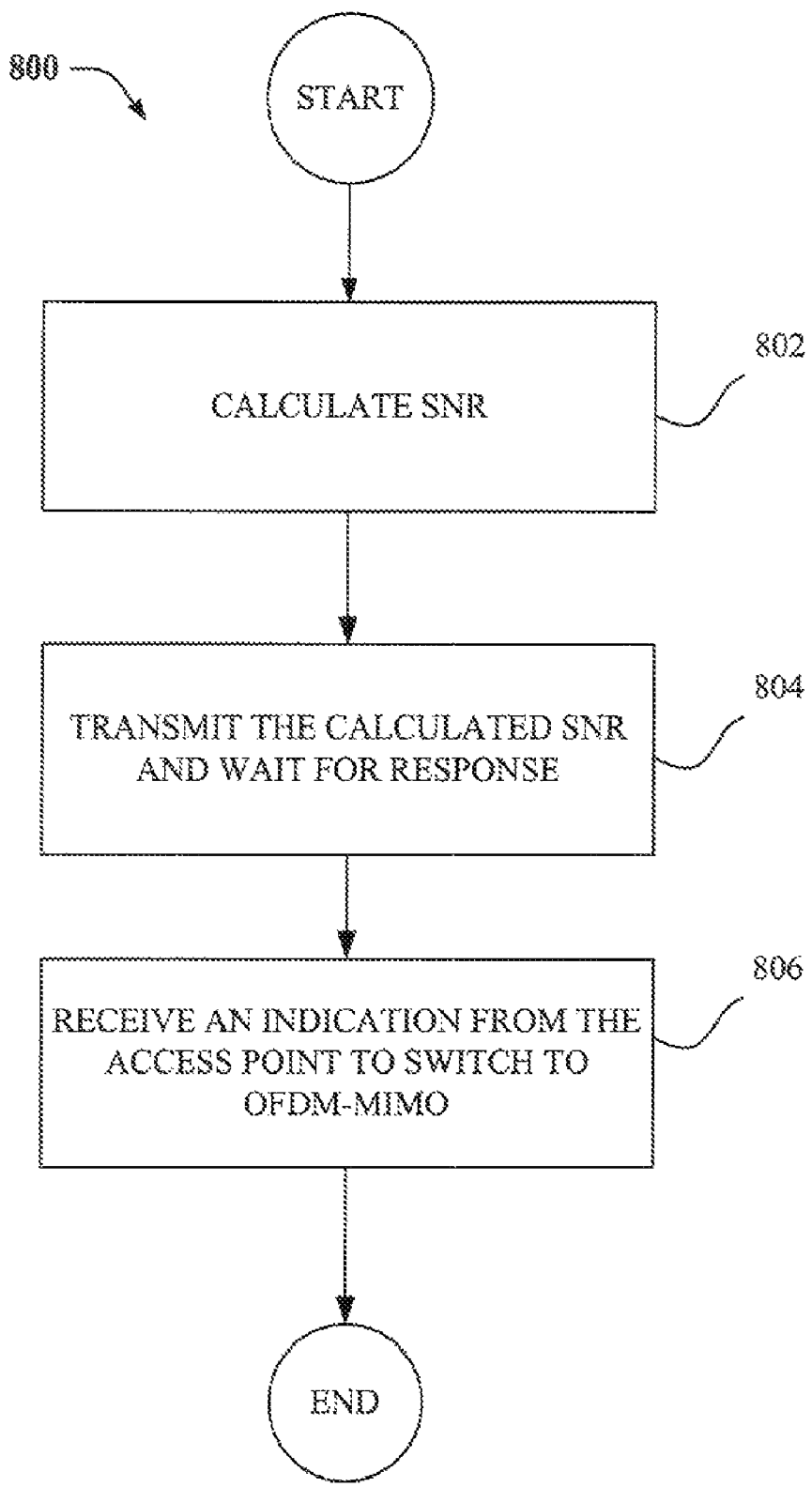
FIG. 8 illustrates a sample methodology for providing switching mechanism by the terminal based on signal to noise ratio.
Figure 9:
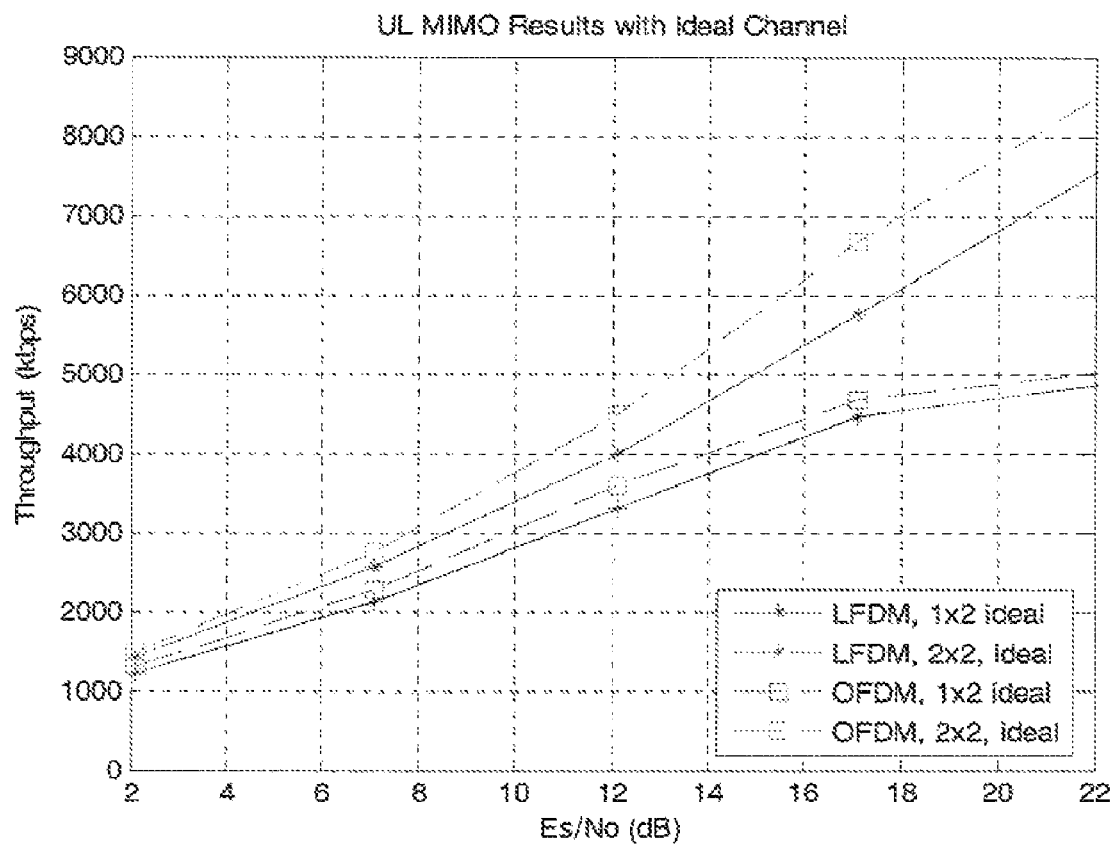
FIGS. 9 and 10 illustrate a respective comparison between MIMO OFDM and MIMO LFDM with ideal channel estimation and realistic channel estimation.

Turning to FIG. 8, an example methodology 800 that facilitates calculating and transmitting SNR information mechanism is illustrated. According to an aspect, at block 802, the method periodically or upon a request from AP, calculates SNR information. At block 804, the method transmits the SNR information to AP and waits for a response. Depending on the value of the SNR information, at block 806, the method receives an indication from the AP to switch to using OFDM-MIMO transmission technique. Depending on rules set up in the UE or other conditions, the UE may make another request or switch to using OFDM-MIMO.

Figure 10:
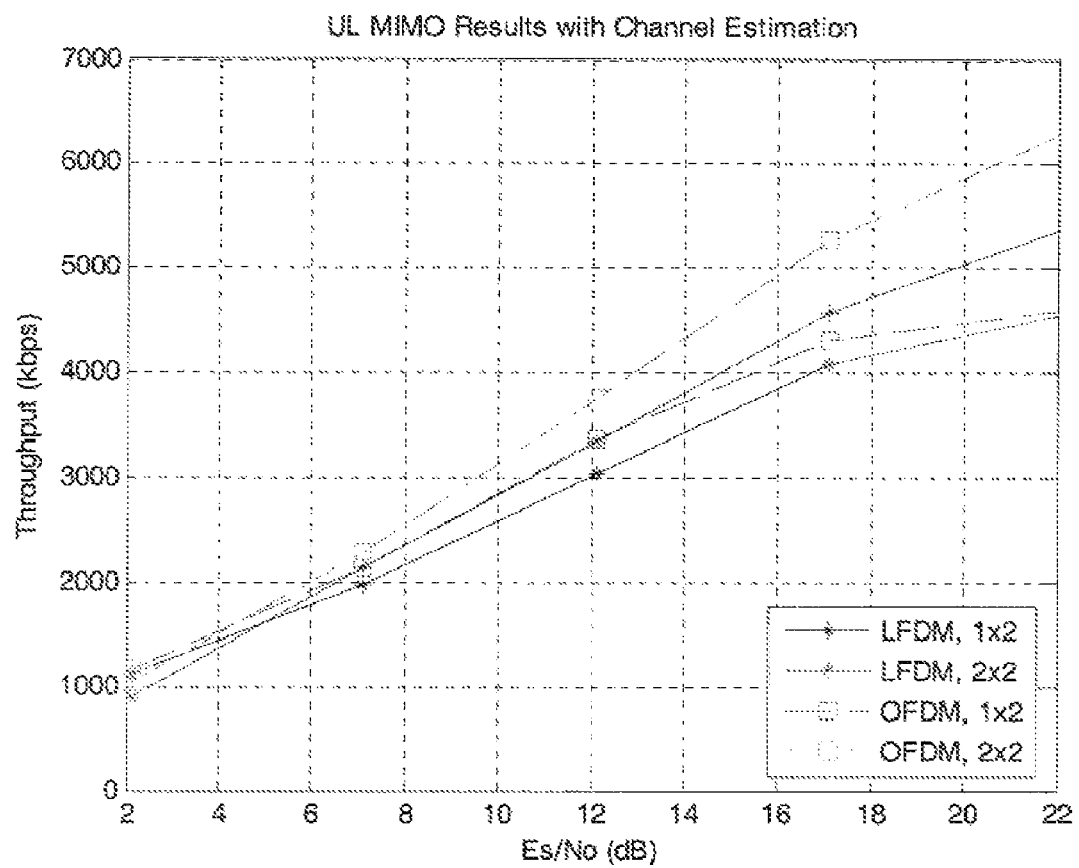
Figure 11:
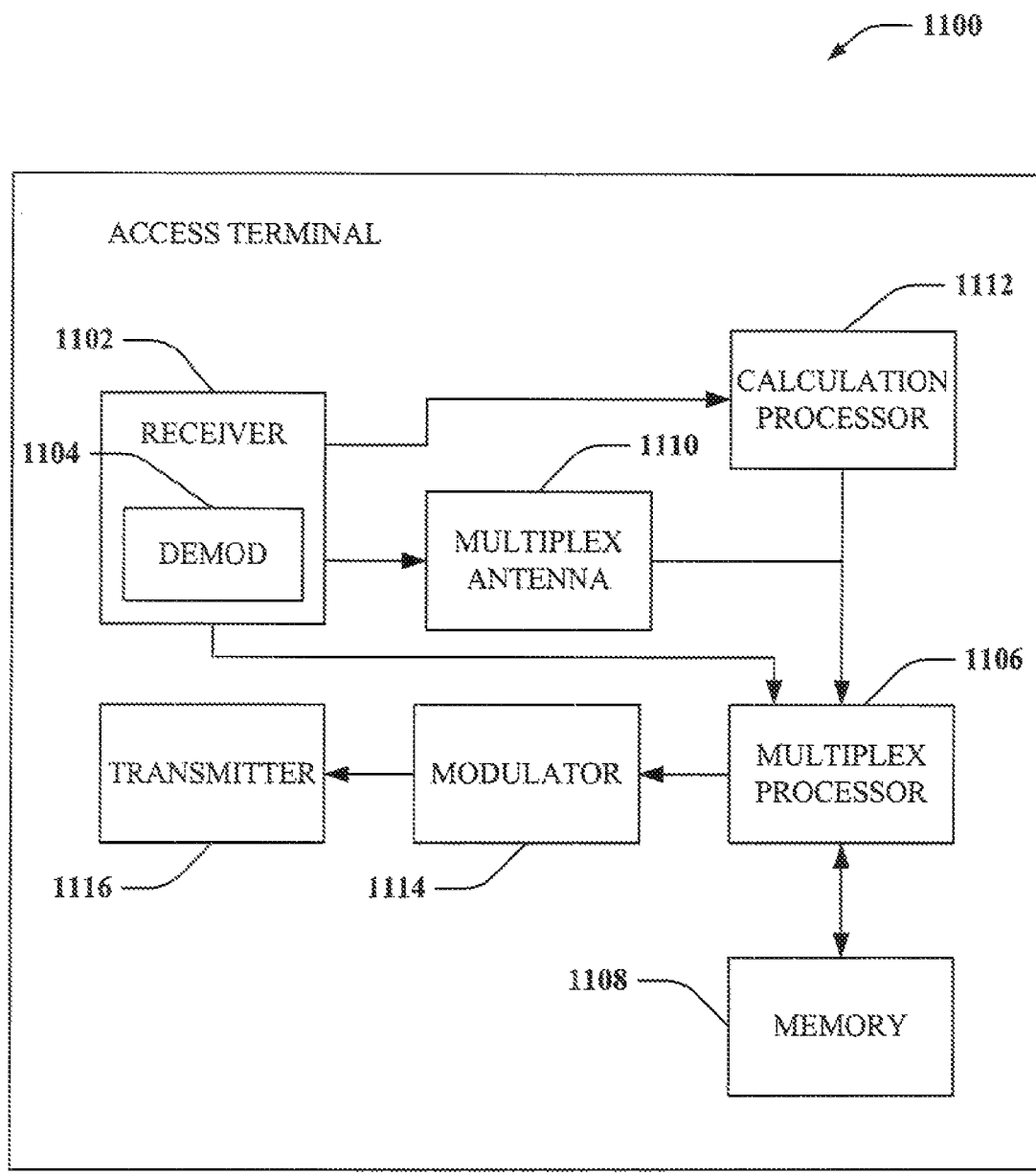
FIG. 11 depicts an exemplary access terminal that can provide feedback to communications networks.

FIGS. 10 and 11 respectively present a comparison between MIMO OFDM and MIMO LFDM with ideal channel estimation and realistic channel estimation, respectively. There is significant gain comparing OFDM and LFDM at high SNR. These results evince LFDM performance is upper bounded by OFDM performance and a significant gap can be observed for frequency selective channels at high SNR.

FIG. 11 depicts an exemplary access terminal 1100 that can provide feedback to communications networks, in accordance with one or more aspects. Access terminal 1100 comprises a receiver 1102 (e.g., an antenna) that receives a signal and performs typical actions on (e.g., filters, amplifies, downconverts, etc.) the received signal. Specifically, receiver 1102 can also receive a service schedule defining services apportioned to one or more blocks of a transmission allocation period, a schedule correlating a block of downlink resources with a block of uplink resources for providing feedback information as described herein, or the like. Receiver 1102 can comprise a demodulator 1104 that can demodulate received symbols and provide them to a processor 1106 for evaluation.

Processor 1106 can be a processor dedicated to analyzing information received by receiver 1102 and/or generating information for transmission by a transmitter 1116. Additionally, processor 1106 can be a processor that controls one or more components of access terminal 1100, and/or a processor that analyzes information received by receiver 1102, generates information for transmission by transmitter 1116, and controls one or more components of access terminal 1100. Additionally, processor 1106 can execute instructions for interpreting a correlation of uplink and downlink resources received by receiver 1102, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 1100 can additionally comprise memory 1108 that is operatively coupled to processor 1106 and that may store data to be transmitted, received, and the like. Memory 1108 may store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to multiplex antenna 1110 that can receive a scheduled correlation between one or more additional blocks of downlink transmission resources and a block of uplink transmission resources (e.g., to facilitate providing multiple NACK or ACK messages in a bitmap response). A multiplex processor 1106 can include a multi-digit bitmap within a feedback message that provides an ACK or NACK message indicating whether a first downlink block and each of one or more additional downlink blocks are received or un-received, over a single uplink resource. Further, a calculation processor 1112 can receive a feedback probability function, wherein the function limits a probability that a feedback message is provided by access terminal 1100, as described herein, if the block of downlink transmission resources, or data associated therewith, is not received. Specifically, such probability function can be employed to reduce interference if multiple devices are reporting lost data simultaneously.

Access terminal 1100 still further comprises a modulator 1114 and a transmitter 1116 that transmits the signal to, for instance, a base station, an access point, another access terminal, a remote agent, etc. Although depicted as being separate from the processor 1106, it is to be appreciated that signal generator 1110 and indicator evaluator 1112 may be part of processor 1106 or a number of processors (not shown).

Figure 12:
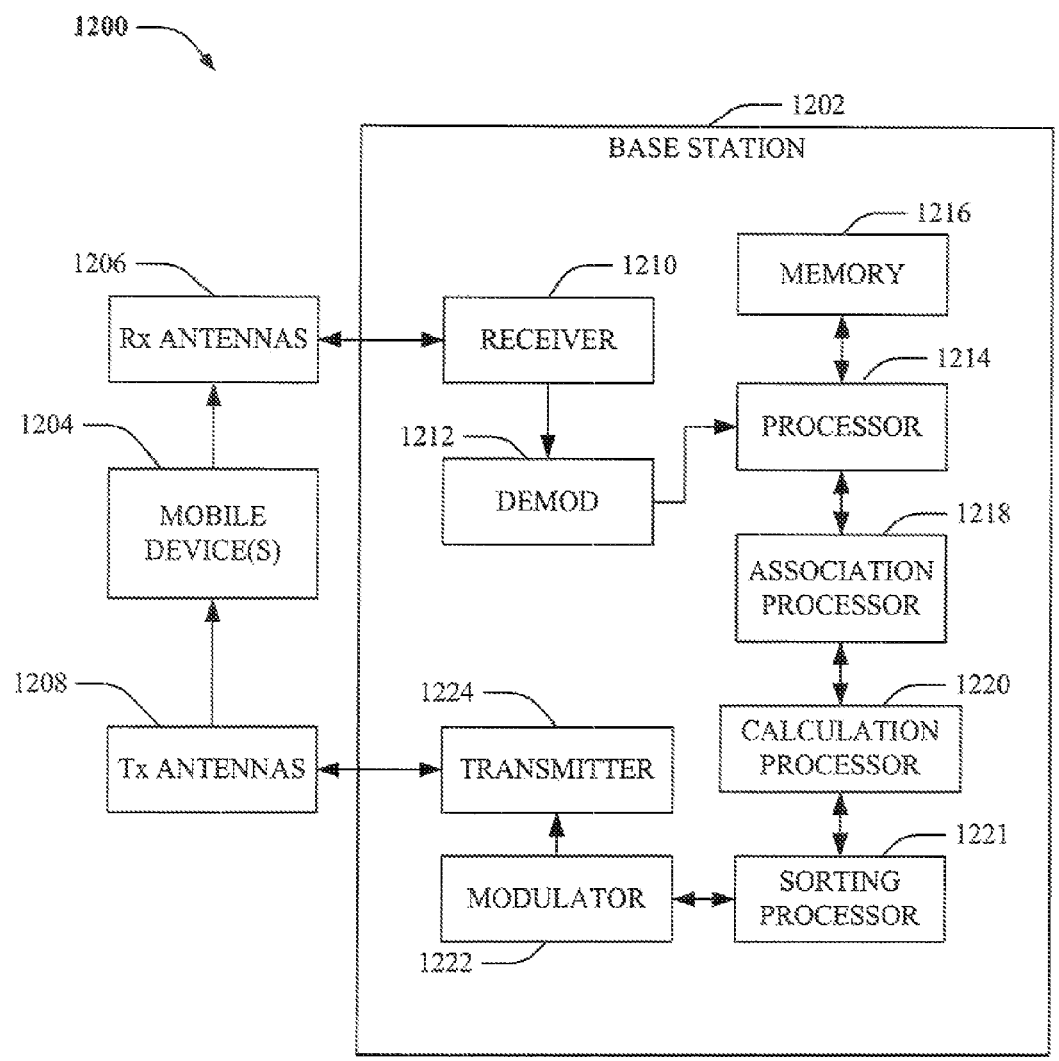
FIG. 12 illustrates an exemplary base station that can be employed in conjunction with a wireless networking environment disclosed herein.

FIG. 12 is an illustration of a system 1200 that facilitates provision of feedback related to lost transmission data for an LTE network. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a transmit antenna 1208. Receiver 1210 can receive information from receive antennas 1206 and can further comprise a signal recipient (not shown) that receives feedback data related to an un-received or indecipherable data packet. Additionally, receiver 1210 is operatively associated with a demodulator 1212 that demodulates received information. Demodulated symbols are analyzed by a processor 1214 that is coupled to a memory 1216 that stores information related to correlating uplink and downlink resources, providing dynamic and/or static correlations from a network, as well as data to be transmitted to or received from mobile device(s) 1204 (or a disparate base station (not shown)), and/or any other suitable information related to performing the various actions and functions set forth herein.

Processor 1214 is further coupled to an association processor 1218 that can schedule a correlation during an allocation period between a block of downlink transmission resources and a block of uplink transmission resources for a multicast or broadcast service. Additionally, association processor 1218 can further schedule a correlation between one or more additional blocks of uplink transmission resources and the block of downlink transmission resources, to enable receipt of a plurality of feedback messages for the downlink resource. As a result, a relative number of feedback messages related to the downlink resource can be determined. Moreover, association processor 1218 can schedule a correlation between a plurality of blocks of downlink transmission resources and an uplink transmission resource for a multicast or broadcast service, such that a single bitmap included within a feedback message can indicate ACK or NACK information for the plurality of blocks of downlink transmission resources.

Association processor 1218 can be coupled to a calculation processor 1220 that generates a probability factor, which can limit a likelihood that a terminal device will provide the feedback message. The probability factor can be employed by base station 1202 to reduce feedback interference from multiple terminal devices. Additionally, calculation processor 1220 can generate a hash function transmitted by base station 1202 that can indicate to each of a plurality of terminal devices a particular uplink transmission resource to use in submitting a feedback message. The hash function indication can be based at least in part on an access class of each terminal device, a hash of each terminal identity, an identity of a service utilized by each terminal device, or block-specific information, or a combination thereof.

Additionally, calculation processor 1220 can be coupled to a sorting processor 1221 that can determine a number of received feedback messages related to the block of downlink transmission resources. For instance, if a block of downlink transmission resources is coupled with multiple uplink transmission resources (e.g., by association processor 1218, as described above), two or more feedback messages can be received by base station 1202 for the downlink resource. The sorting processor 1221 can therefore identify what feedback messages correspond to the downlink block, which can indicate a retransmission priority for that downlink block. Furthermore, the sorting processor 1221 can elect between retransmitting multiple blocks of downlink transmission resources based at least in part on the number of received feedback messages related to each block of downlink transmission resources.

Figure 13:
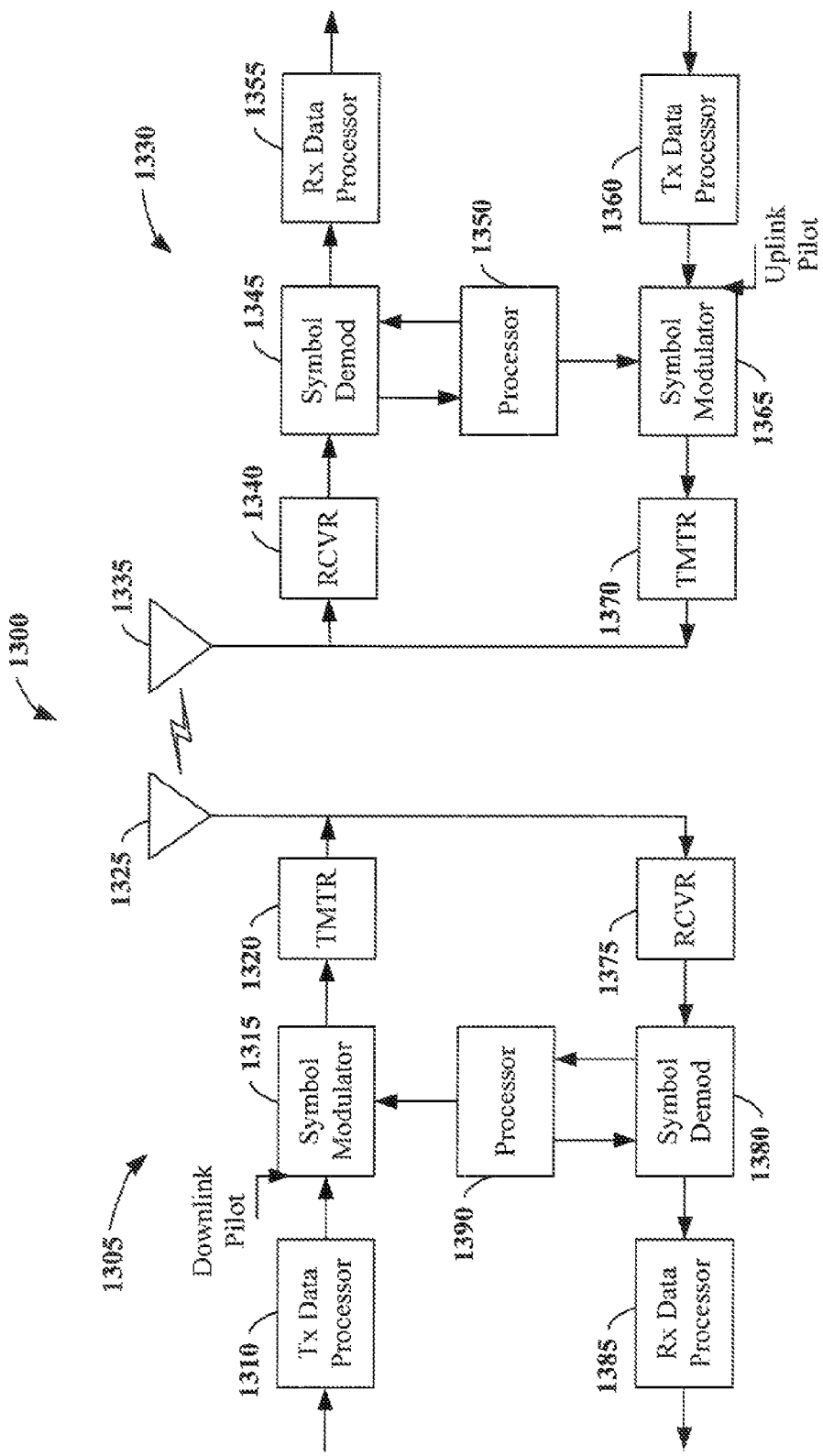
FIG. 13 illustrates a block diagram of an embodiment of a transmitter system and a receiver system in a multi-input multi-output multiple access wireless.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and provides them to a transmitter unit (TMTR) 1320. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1320 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

It is to be understood that the aspects described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 14:
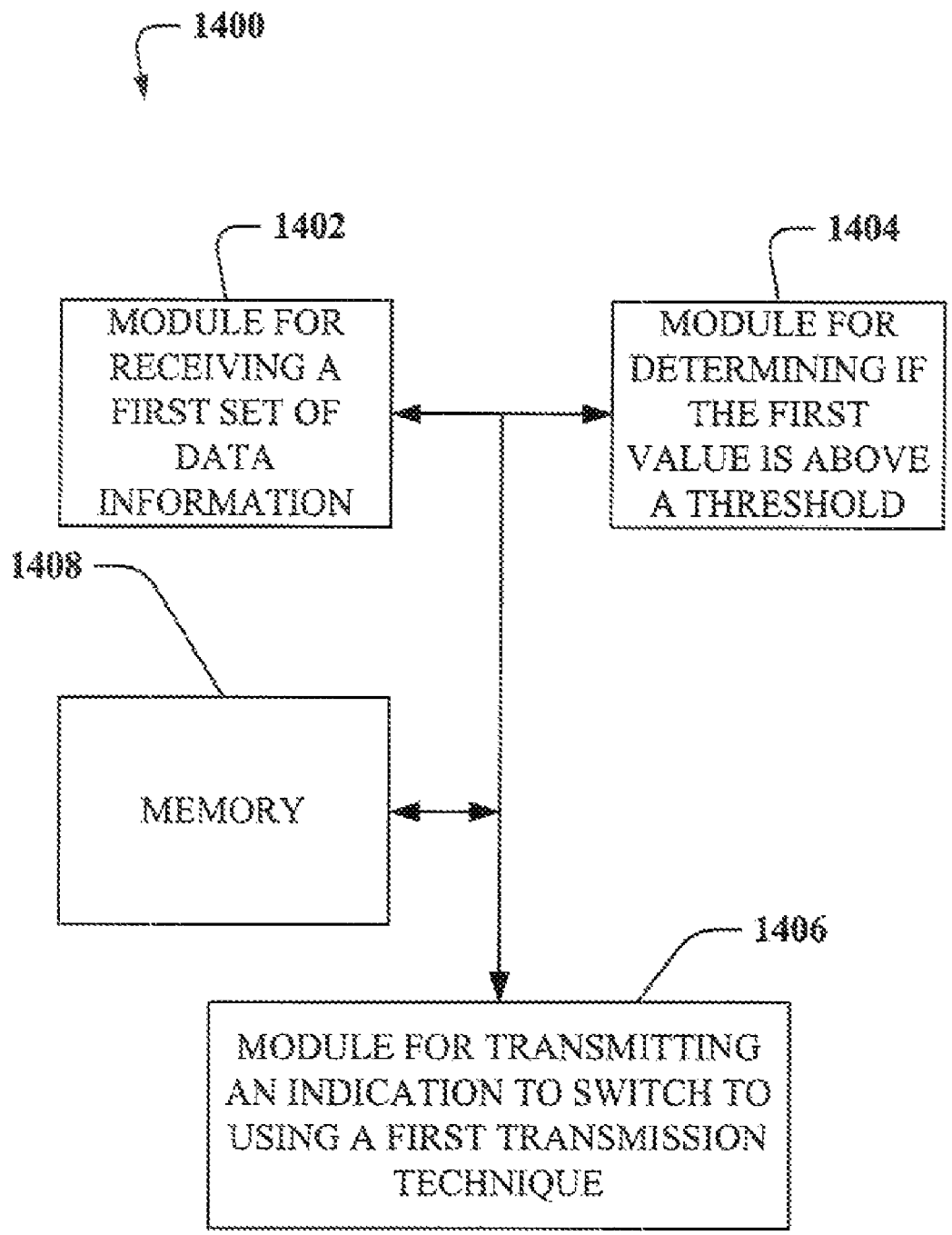
FIG. 14 depicts an exemplary system that switching mechanism of transmission technique in accordance with one or more aspects.

Referring now to FIG. 14, a system 1400 that facilitates a switching mechanism in a wireless communication is illustrated. System 1400 may include a module 1402 for receiving a first set of data information, wherein the first set of information comprising a first value. A module 1404 for determining if the first value is above a threshold and a module 1406 for transmitting an indication to switch to using a first transmission technique if determined that the first value is above the threshold. Modules 1402-1406 may be a processor or any electronic device and may be coupled to memory module 1408.

Figure 15:
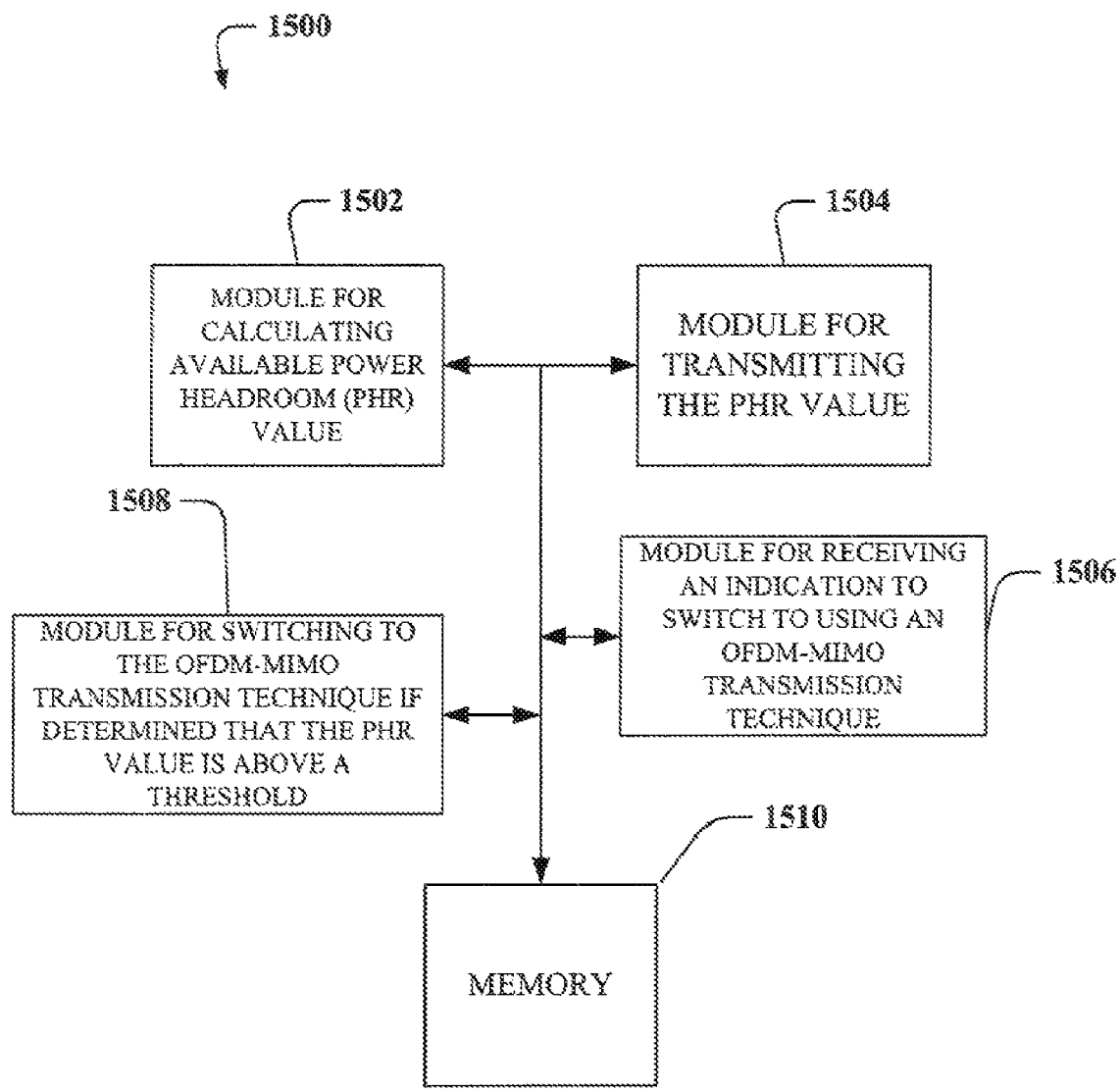
FIG. 15 depicts an exemplary system that switching mechanism of transmission technique in accordance with additional aspects.

Referring now to FIG. 15, a system 1500 that facilitates a switching mechanism in a wireless communication is illustrated. System 1500 may include a module 1502 for calculating available power headroom (PHR) value using the reference signal level. A module 1504 for transmitting the PHR value. A module 1506 for receiving an indication to switch to using an OFDM-MIMO transmission technique and a module 1508 for switching to the OFDM-MIMO transmission technique if determined that the PHR value is above a threshold. Modules 1502-1508 may be a processor or any electronic device and may be coupled to memory module 1510.

Figure 16:
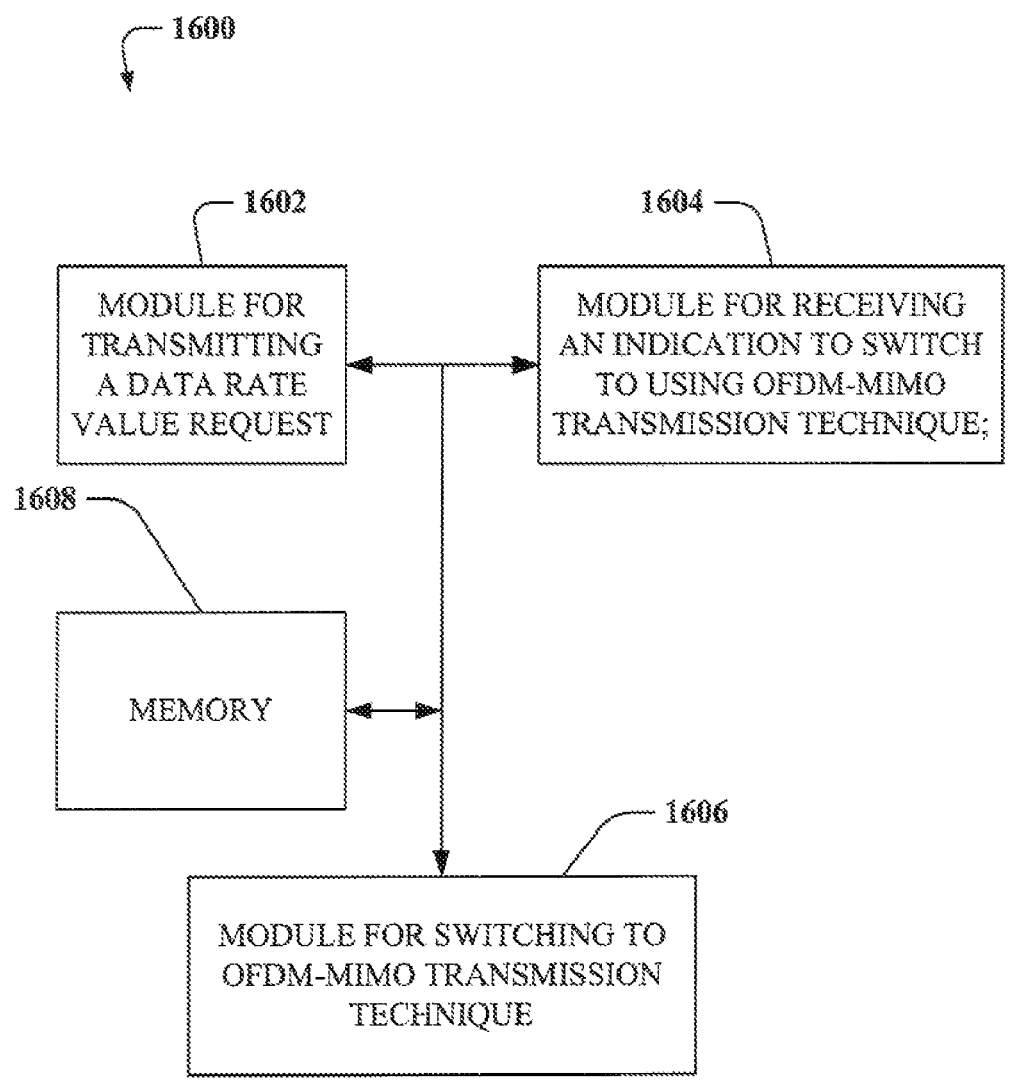
FIG. 16 depicts an exemplary system that switching mechanism of transmission technique in accordance with additional aspects.

Referring now to FIG. 16, a system 1600 that facilitates a switching mechanism in a wireless communication is illustrated. System 1600 may include a module 1602 for transmitting a data rate value request. A module 1604 for receiving an indication to switch to using OFDM-MIMO transmission technique and a module 1606 for switching to OFDM-MIMO transmission technique. Modules 1602-1606 may be a processor or any electronic device and may be coupled to memory module 1608.

Figure 17:
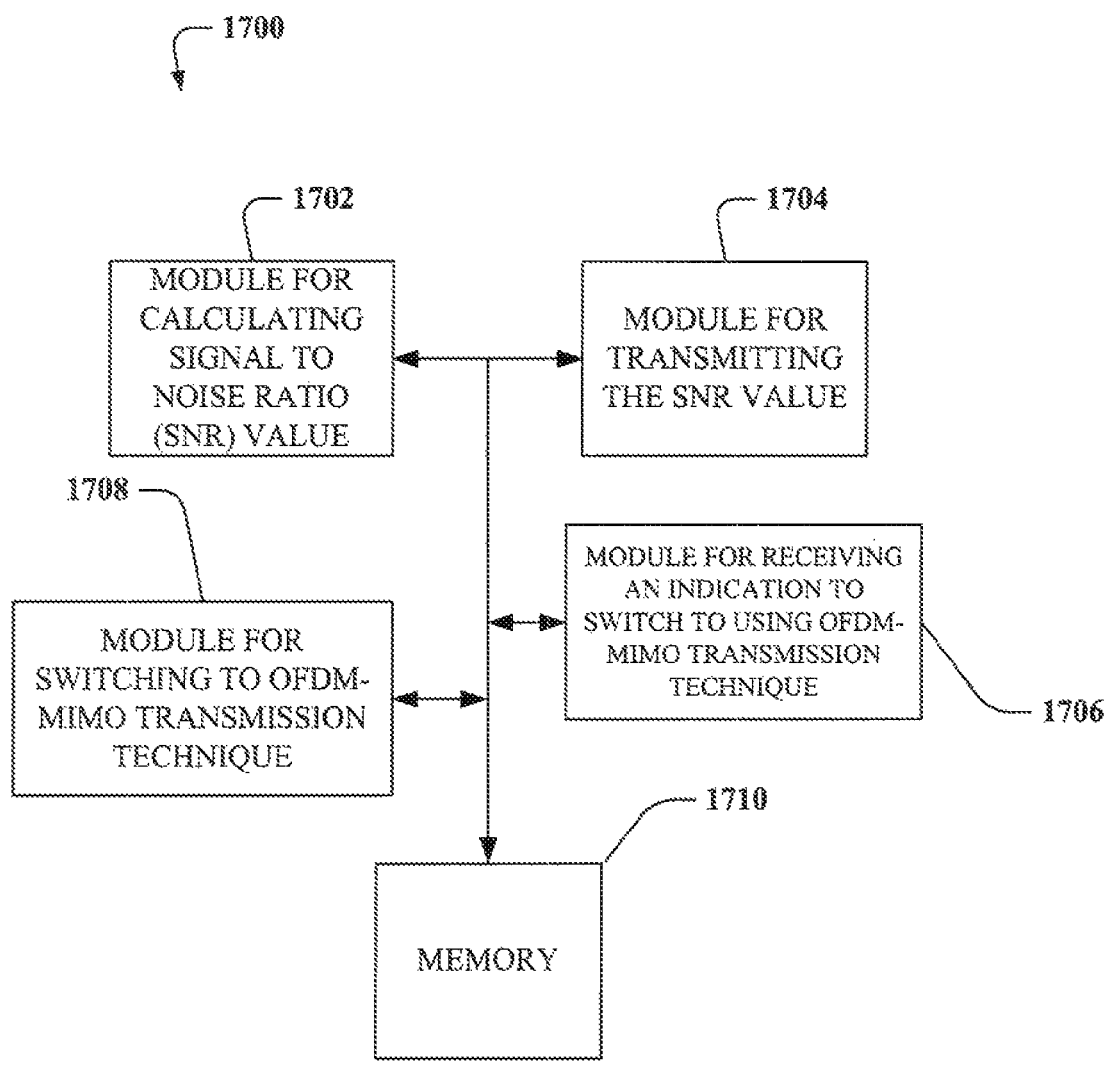
FIG. 17 depicts an exemplary system that switching mechanism of transmission technique in accordance with additional aspects.

Referring now to FIG. 17, a system 1700 that facilitates a switching mechanism in a wireless communication is illustrated. System 1700 may include a module 1702 for calculating signal to noise ratio (SNR) value. A module 1704 for transmitting the SNR value. A module 1706 module for receiving an indication to switch to using OFDM-MIMO transmission technique and a module 1708 for switching to OFDM-MIMO transmission technique. Modules 1702-1708 may be a processor or any electronic device and may be coupled to memory module 1710.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for a wireless communication network, comprising:
   receiving a first set of data information, wherein the first set of information comprising a first value;
   determining if the first value is above a threshold, using a processor;
   transmitting an indication to switch to using a first transmission technique if determined that the first value is above the threshold, wherein the first transmission technique comprises an orthogonal frequency division multiplexing-multiple input multiple output (OFDM-MIMO) transmission technique which bypasses a Discrete Fourier Transform (DFT) operation; and
   transmitting another indication to use a second transmission technique if determined that the first value is not above the threshold, wherein the second transmission technique comprises a localized frequency division multiplexing-single input multiple output (LFDM-SIMO) transmission technique.

2. The method as claimed in claim 1, wherein, the determining if the first value is above the threshold, comprises determining if signal to noise ratio (SNR) value is above the threshold.

3. The method as claimed in claim 2, further comprising, measuring the SNR value of a terminal.

4. The method as claimed in claim 1, wherein, determining if the first value is above the threshold, comprises determining if a data rate value is above the threshold.

5. The method as claimed in claim 4, further comprising, receiving the first value from a terminal, wherein the first value is the data rate requested by the terminal.

6. The method as claimed in claim 5, further comprising, determining if the terminal requesting the data rate is using the OFDM-MIMO transmission technique prior to the transmitting the indication.

7. The method as claimed in claim 1, wherein, determining if the first value is above the threshold, comprises determining if a power head room (PHR) value is above the threshold.

8. The method as claimed in claim 7, further comprising, splitting power among transmit antennas if determined that the PHR value is above the threshold; and
   calculating data rate of each stream prior to transmitting the indication.

9. The method as claimed in claim 7, further comprising, receiving a PHR value from a terminal.

10. An apparatus for wireless communication, comprising:
    means for receiving a first set of data information, wherein the first set of information comprising a first value;
    means for determining if the first value is above a threshold;
    means for transmitting an indication to switch to using a first transmission technique if determined that the first value is above the threshold, wherein the first transmission technique comprises an orthogonal frequency division multiplexing-multiple input multiple output (OFDM-MIMO) transmission technique which bypasses a Discrete Fourier Transform (DFT) operation; and
    means for transmitting another indication to use a second transmission technique if determined that the first value is not above the threshold, wherein the second transmission technique comprises a localized frequency division multiplexing-single input multiple output (LFDM-SIMO) transmission technique.

11. The apparatus as claimed in claim 10, wherein, the means for determining if the first value is above the threshold, comprises means for determining if signal to noise ratio (SNR) value is above the threshold.

12. The apparatus as claimed in claim 11, further comprising, means for measuring the SNR value of a terminal.

13. The apparatus as claimed in claim 10, wherein, means for determining if the first value is above the threshold, comprises means for determining if a data rate value is above the threshold.

14. The apparatus as claimed in claim 13, further comprising, means for receiving the first value from a terminal, wherein the first value is the data rate requested by the terminal.

15. The apparatus as claimed in claim 14, further comprising, means for determining if the terminal requesting the data rate is using the OFDM-MIMO transmission technique prior to the transmitting the indication.

16. The apparatus as claimed in claim 10, wherein, means for determining if the first value is above the threshold, comprises means for determining if a power head room (PHR) value is above the threshold.

17. The apparatus as claimed in claim 16, further comprising,
means for splitting power among transmit antennas if determined that the PHR value is above the threshold; and
means for calculating data rate of each stream prior to transmitting the indication.

18. The apparatus as claimed in claim 16, further comprising, means for receiving a PHR value from a terminal.

19. A non-transitory computer readable medium having stored thereon computer executable instructions for performing the following instructions:
receiving a first set of data information, wherein the first set of information comprising a first value;
determining if the first value is above a threshold;
transmitting an indication to switch to using a first transmission technique if determined that the first value is above the threshold, wherein the first transmission technique comprises an orthogonal frequency division multiplexing-multiple input multiple output (OFDM-MIMO) transmission technique which bypasses a Discrete Fourier Transform (DFT) operation; and
transmitting another indication to use a second transmission technique if determined that the first value is not above the threshold, wherein the second transmission technique comprises a localized frequency division multiplexing-single input multiple output (LFDM-SIMO) transmission technique.

20. A method for a wireless communication network, comprising:
monitoring a reference signal level;
calculating available power headroom (PHR) value using the reference signal level, by a processor;
transmitting the PHR value;
receiving a first indication to use an orthogonal frequency division multiplexing-multiple input multiple output (OFDM-MIMO) transmission technique if the PHR value is above a threshold and a second indication to use a localized frequency division multiplexing-single input multiple output (LFDM-SIMO) transmission technique if the PHR value is not above the threshold;
responsive to receiving the first indication, switching to the OFDM-MIMO transmission technique by bypassing a Discrete Fourier Transform (DFT) operation; and
responsive to receiving the second indication, transmitting information using the LFDM-SIMO transmission technique.

21. An apparatus for wireless communication, comprising:
means for monitoring a reference signal level;
means for calculating available power headroom (PHR) value using the reference signal level;
means for transmitting the PHR value;
means for receiving a first indication to use an orthogonal frequency division multiplexing-multiple input multiple output (OFDM-MIMO) transmission technique if the PHR value is above a threshold and a second indication to use a localized frequency division multiplexing-single input multiple output (LFDM-SIMO) transmission technique if the PHR value is not above the threshold;
means for, responsive to receiving the first indication, switching to the OFDM-MIMO transmission technique by bypassing a Discrete Fourier Transform (DFT) operation; and
means for, responsive to receiving the second indication, transmitting information using the LFDM-SIMO transmission technique.

22. A non-transitory computer readable medium having stored thereon computer executable instructions for performing the following instructions:
monitoring a reference signal level;
calculating available power headroom (PHR) value using the reference signal level;
transmitting the PHR value;
receiving a first indication to use an orthogonal frequency division multiplexing-multiple input multiple output (OFDM-MIMO) transmission technique if the PHR value is above a threshold and a second indication to use a localized frequency division multiplexing-single input multiple output (LFDM-SIMO) transmission technique if the PHR value is not above the threshold;
responsive to receiving the first indication, switching to the OFDM-MIMO transmission technique by bypassing a Discrete Fourier Transform (DFT) operation; and
responsive to receiving the second indication, transmitting information using the LFDM-SIMO transmission technique.

23. A method for a wireless communication network, comprising:
transmitting a data rate value request;
receiving a first indication to use an orthogonal frequency division multiplexing-multiple input multiple output (OFDM-MIMO) transmission technique if a requested data rate value is above a threshold and a second indication to use a localized frequency division multiplexing-single input multiple output (LFDM-SIMO) transmission technique if the data rate value is not above the threshold;
responsive to receiving the first indication, switching to the OFDM-MIMO transmission technique by bypassing a Discrete Fourier Transform (DFT) operation; and
responsive to receiving the second indication, transmitting information using the LFDM-SIMO transmission technique.

24. An apparatus for wireless communication, comprising:
means for transmitting a data rate value request;
means for receiving a first indication to switch to using an orthogonal frequency division multiplexing-multiple input multiple output (OFDM-MIMO) transmission technique if a requested data rate value is above a threshold and a second indication to use a localized frequency division multiplexing-single input multiple output (LFDM-SIMO) transmission technique if the data rate value is not above the threshold;
means for, responsive to receiving the first indication, switching to the OFDM-MIMO transmission technique by bypassing a Discrete Fourier Transform (DFT) operation; and
means for, responsive to receiving the second indication, transmitting information using the LFDM-SIMO transmission technique.

25. A non-transitory computer readable medium having stored thereon computer executable instructions for performing the following instructions:
transmitting a data rate value request;
receiving a first indication to switch to using an orthogonal frequency division multiplexing-multiple input multiple output (OFDM-MIMO) transmission technique if a data requested rate value is above a threshold and a second indication to use a localized frequency division multiplexing-single input multiple output (LFDM-SIMO) transmission technique if the data rate value is not above the threshold;

responsive to receiving the first indication, switching to the OFDM-MIMO transmission technique by bypassing a Discrete Fourier Transform (DFT) operation; and responsive to receiving the second indication, transmitting information using the LFDM-SIMO transmission technique.

26. A method for a wireless network, comprising:

calculating signal to noise ratio (SNR) value, using a processor;

transmitting the SNR value;

receiving a first indication to switch to using an orthogonal frequency division multiplexing-multiple input multiple output (OFDM-MIMO) transmission technique if the SNR value is above a threshold and a second indication to use a localized frequency division multiplexing-single input multiple output (LFDM-SIMO) transmission technique if the SNR value is not above the threshold;

responsive to receiving the first indication, switching to the OFDM-MIMO transmission technique by bypassing a Discrete Fourier Transform (DFT) operation; and responsive to receiving the second indication, transmitting information using the LFDM-SIMO transmission technique.

27. An apparatus for wireless communication, comprising:

means for calculating signal to noise ratio (SNR) value;

means for transmitting the SNR value;

means for receiving a first indication to switch to using an orthogonal frequency division multiplexing-multiple input multiple output (OFDM-MIMO) transmission technique if the SNR value is above a threshold and a second indication to use a localized frequency division multiplexing-single input multiple output (LFDM-SIMO) transmission technique if the SNR value is not above the threshold;

means for, responsive to receiving the first indication, switching to the OFDM-MIMO transmission technique by bypassing a Discrete Fourier Transform (DFT) operation; and means for, responsive to receiving the second indication, transmitting information using the LFDM-SIMO transmission technique.

28. A non-transitory computer readable medium having stored thereon computer executable instructions for performing the following instructions:

calculating signal to noise ratio (SNR) value;

transmitting the SNR value;

receiving a first indication to switch to using an orthogonal frequency division multiplexing-multiple input multiple output (OFDM-MIMO) transmission technique if the SNR value is above a threshold and a second indication to use a localized frequency division multiplexing-single input multiple output (LFDM-SIMO) transmission technique if the SNR value is not above the threshold;

responsive to receiving the first indication, switching to the OFDM-MIMO transmission technique by bypassing a Discrete Fourier Transform (DFT) operation; and responsive to receiving the second indication, transmitting information using the LFDM-SIMO transmission technique.

29. An integrated circuit comprising:

at least one processor configured to:

receive a first set of data information, wherein the first set of information comprising a first value;

determine if the first value is above a threshold;

transmit an indication to switch to using a first transmission technique if determined that the first value is above the threshold, wherein the first transmission technique comprises an orthogonal frequency division multiplexing-multiple input multiple output (OFDM-MIMO) transmission technique which bypasses a Discrete Fourier Transform (DFT) operation; and transmit another indication to use a second transmission technique if determined that the first value is not above the threshold, wherein the second transmission technique comprises a localized frequency division multiplexing-single input multiple output (LFDM-SIMO) transmission technique.

30. The integrated circuit as claimed in claim 29, wherein the at least one processor is configured to determine one of:

if a signal to noise ratio (SNR) value is above the threshold, the SNR value being measured with respect to a terminal;

if a data rate value is above the threshold, the data rate value being requested by a terminal; and if a power head room (PHR) value is above the threshold, the PHR value being received from a terminal.

* * * * *